(No Model.)
D. HUGENDUBLER.
Shaft Supporter.
No. 241,985. Patented May 24, 1881.
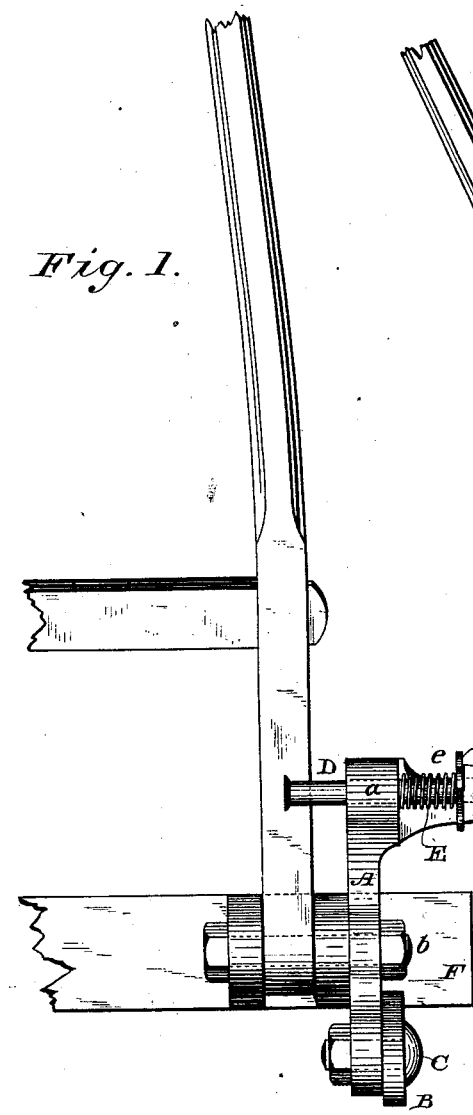

UNITED STATES PATENT OFFICE.

DAVID HUGENDUBLER, OF CAMPBELLTOWN, PENNSYLVANIA.

SHAFT-SUPPORTER.

SPECIFICATION forming part of Letters Patent No. 241,985, dated May 24, 1881.

Application filed March 2, 1881. (No model.)

*To all whom it may concern:*

Be it known that I, DAVID HUGENDUBLER, of Campbelltown, in the county of Lebanon and State of Pennsylvania, have invented an Improved Shaft-Supporter, of which the following is a specification.

The object of my invention is to provide an adjustable device for holding the shafts of a vehicle in any desired elevated position that can readily be attached to any vehicle, and is simple in construction and operation.

In the accompanying drawings, Figure 1 shows a full front view of my device attached to the shaft-box of a vehicle; Fig. 2, a side view of the same.

On one end of the plate and at right angles to it is a projection, $d$, notched at $e$. The pin D, having a cross piece or head, $f$, and encircled by a spiral spring, E, moves freely endwise through the plate by the side of the projection $d$, but is prevented from being withdrawn therefrom by its enlarged or blunted end.

B is a brace or dog, having a longitudinal slot, $g$, and a notch, $h$, and is attached to the plate A by the bolt C.

The device thus constructed is attached to the shaft-box of a vehicle by passing the bolt $b$ of the shaft-coupling through the plate in such a manner that it will turn freely about the same. The brace B rests against the axle F and holds the plate A in position. The position of the plate, and consequently the height at which the shafts are to be held, can be regulated by adjusting the slotted brace or dog by means of the bolt and nut.

When the shafts are elevated the pin D is pressed through the plate and the cross piece or head $f$ is secured in the notch $e$, so that a considerable portion of the pin passes under one of the shafts and forms the support.

When it is desired to lower the shafts the head of the pin is disengaged from the notch $e$ and the pin is withdrawn from under the shaft by the action of the spring E.

Having thus described my invention, what I claim as new, and desire to secure by Letters Patent, is—

1. The combination, substantially as herein set forth, of the plate A, having the projection $d$, with the brace B, pin D, and spring E.

2. The combination of the plate A, brace B, and pin D, substantially as hereinbefore described.

3. The combination of the plate having the notched projection thereon, the pin, the spring, the slotted brace, and the bolt and nut for adjusting the brace, substantially as described.

DAVID HUGENDUBLER.

Witnesses:
JACOB E. EVANS,
WILLIAM CAROTHERS.